(12) United States Patent
Denhez

(10) Patent No.: US 7,088,576 B2
(45) Date of Patent: Aug. 8, 2006

(54) RUGGEDIZED, COMPACT PERSONAL INFORMATION APPLIANCE

(75) Inventor: Nicolas Denhez, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 476 days.

(21) Appl. No.: 10/384,090

(22) Filed: Mar. 7, 2003

(65) Prior Publication Data

US 2004/0174669 A1 Sep. 9, 2004

(51) Int. Cl.
*G06F 1/16* (2006.01)

(52) U.S. Cl. .................... 361/683; 361/681; 206/305; 206/320; 379/433.01

(58) Field of Classification Search .............. 361/679, 361/683, 689, 801, 803, 814, 807, 809; 345/168, 345/169, 173, 905; 400/691–693; 220/581, 220/836, 843–848, 811–815, 4.22, 4.23; 206/5, 320; 248/309, 688, 917, 918; 379/433, 379/434, 420, 429; 181/125, 141, 155, 159, 181/199; 381/153, 188, 189, 205
See application file for complete search history.

(56) References Cited

U.S. PATENT DOCUMENTS

| | | | | | |
|---|---|---|---|---|---|
| 4,836,256 | A | * | 6/1989 | Meliconi | 206/523 |
| 4,901,852 | A | * | 2/1990 | King | 206/320 |
| 5,002,184 | A | * | 3/1991 | Lloyd | 206/305 |
| 5,499,713 | A | * | 3/1996 | Huffer | 206/320 |
| 5,896,453 | A | * | 4/1999 | Speaks | 379/433.01 |
| 6,092,707 | A | * | 7/2000 | Bowes, Jr. | 224/435 |
| 6,132,367 | A | * | 10/2000 | Adair | 600/101 |
| 6,273,252 | B1 | * | 8/2001 | Mitchell | 206/320 |
| 6,625,394 | B1 | * | 9/2003 | Smith et al. | 396/26 |
| 6,634,494 | B1 | * | 10/2003 | Derr et al. | 206/305 |
| 6,646,864 | B1 | * | 11/2003 | Richardson | 361/681 |
| 6,659,274 | B1 | * | 12/2003 | Enners | 206/305 |
| 6,721,651 | B1 | * | 4/2004 | Minelli | 701/200 |
| 2002/0071550 | A1 | * | 6/2002 | Pletikosa | 379/433.01 |
| 2003/0012012 | A1 | * | 1/2003 | Hong | 362/85 |

OTHER PUBLICATIONS

Ross kerber—"Battle Hardened Computer Gear Made to Withstand the Rigors of War" The Boston Globe—Feb. 19, 2003—3 pages.

* cited by examiner

*Primary Examiner*—Michael Datskovskiy
(74) *Attorney, Agent, or Firm*—Lloyd E. Dakin, Jr.

(57) ABSTRACT

A ruggedized, compact personal information appliance apparatus and process of manufacture is disclosed. The apparatus discloses an information appliance surrounded by an encapsulation element. The encapsulation element isolates predetermined exterior portions of the appliance from a predetermined set of environmental conditions. The process of manufacturing discloses: identifying a predetermined set of environmental conditions; identifying a predetermined set of structures on the appliance, which are to be protected from the environmental conditions; selecting an encapsulation element which can protect the appliance from the environmental conditions; and surrounding the set of structures with the encapsulation element.

23 Claims, 4 Drawing Sheets

RUGGEDIZED, COMPACT PERSONAL INFORMATION APPLIANCE

BACKGROUND OF THE INVENTION

1. Field of the Invention

The present invention relates generally to personal information appliances, and more particularly to a ruggedized, compact personal information appliance.

2. Discussion of Background Art

A Personal Digital Assistant (PDA) is becoming a generic term for any, typically handheld, computing device which permits users to store and retrieve information from in either business or consumer contexts. Often they are used for calendaring appointments and storing contact addresses. They can include a small keyboard, a touch sensitive pad, and some sort of display area. Others further included network communications capabilities permitting users to wirelessly download information or place phone calls.

The popularity of such PDAs stems primarily from this multi-functional ability to provide users with the information they need and when they need it, or so they are advertised as doing. In reality, PDAs are basically compact computers that would be more at home in a relatively sterile desktop environment or carried within a briefcases, as most laptops currently are. PDA warranties are often voided should such devices be exposed to harsh environmental conditions, including high exposure to water or excessive humidity, and being dropped.

Such current designs are also often boxy and awkward to use, requiring two hands and specific lighting conditions, so that their displays are not washed-out to the point of becoming very difficult to view.

In response to the concerns discussed above, what is needed is an information appliance apparatus that overcomes the problems of the prior art.

SUMMARY OF THE INVENTION

The present invention is an apparatus which includes an information appliance surrounded by an encapsulation element. The encapsulation element isolates predetermined exterior portions of the appliance from a predetermined set of environmental conditions.

The process of manufacturing the present invention includes the steps of: identifying a predetermined set of environmental conditions; identifying a predetermined set of structures on the appliance, which are to be protected from the environmental conditions; selecting an encapsulation element which can protect the appliance from the environmental conditions; and surrounding the set of structures with the encapsulation element.

These and other aspects of the invention will be recognized by those skilled in the art upon review of the detailed description, drawings, and claims set forth below.

DETAILED DESCRIPTION OF THE PREFERRED EMBODIMENT

The present invention is a ruggedized and preferably compact personal information appliance which in various embodiments can function as a Personal Digital Assistant (PDA), a voice recorder, a still camera, a video camera, and a networked communication device. In general the appliance can be any instrument for capturing, carrying, and/or sharing information.

Preferably the appliance is encapsulated in a weatherproof and shock absorbent shell providing a user with all weather capability and rugged durability, thereby enabling such users to truly remain connected wherever they go, be it on the ski slopes, at the beach, or Kayaking down a river.

The appliance is also preferably of an ovoid shape which can be carried as easily as a Swiss Army Knife or around the neck with a lanyard. And, an embedded micro-display window permits a user to view information not only in complete privacy, but under all lighting conditions.

Figure 1:
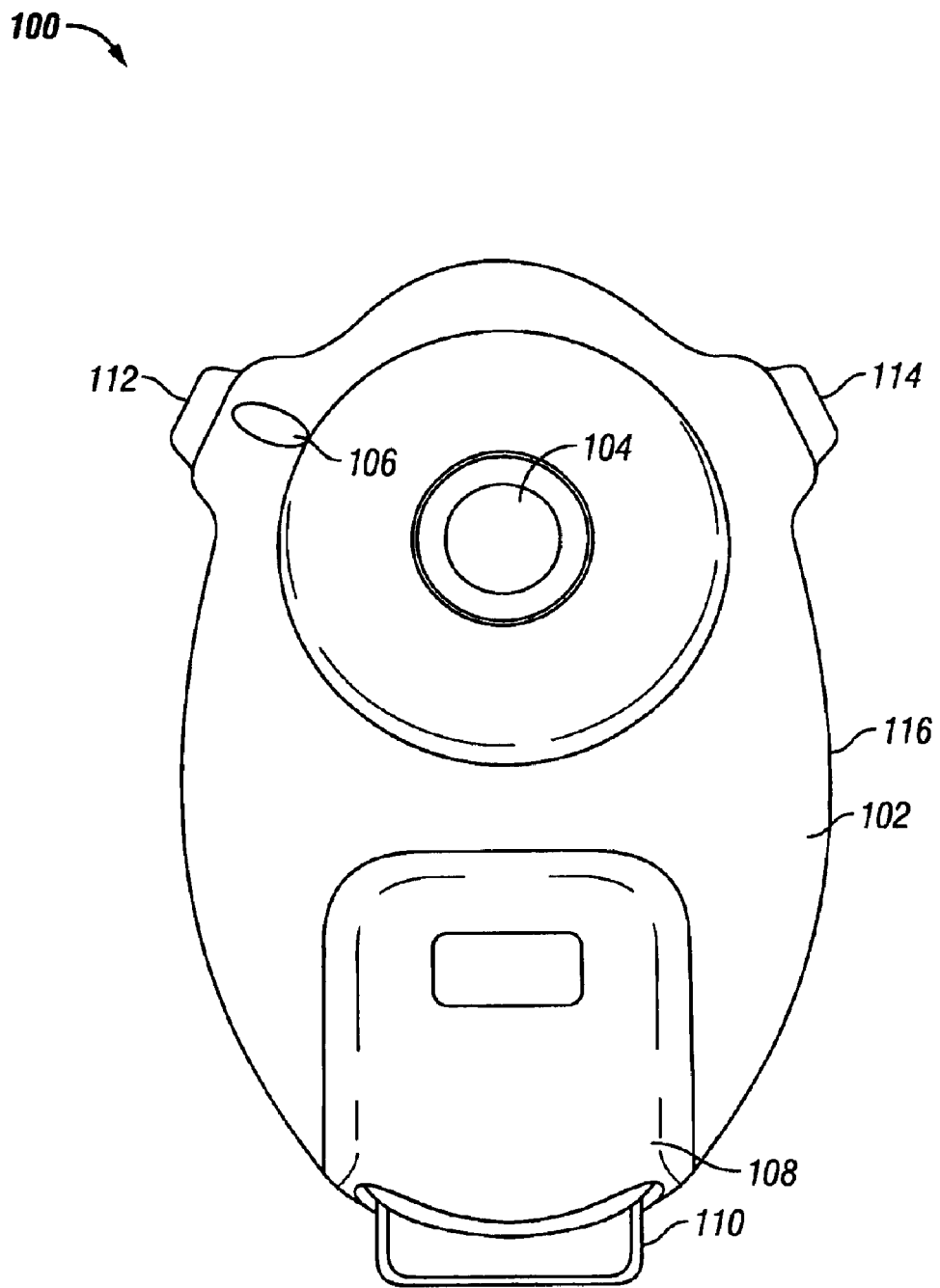
FIG. 1 is a frontal view of one embodiment of a ruggedized, compact personal information appliance.

FIG. 1 is a frontal view of one embodiment of a ruggedized, compact personal information appliance 100. Only one preferred embodiment of the appliance 100 is shown, however those skilled in the art will recognize that the functional and structural element of the present invention may be in whole or part be formed into many other embodiments of the present invention.

The appliance 100 includes an ovoid shaped front surface 102 which is preferably opaque. The ovoid form provides an ergonomic and organic shape which can be easily held within only one of a user's hands. Ovoid is herein clarified as an asymmetrical egg shape having two different elliptical halves.

On the front surface 102 are preferably a set of information capture sensors, including a camera/video capture senor 104, and a sound sensor 106. Other sensors can be added as well. The camera/video capture senor 104 permits a user to capture a set of optical images and preferably includes optical zoom and image stabilization features. The sound sensor 106 permits the user to either make personal voice or ambient sound recordings. The sound sensor 106 in conjunction with a speaker, also permits the appliance 100 to function as a telephone.

The front surface 102 also shows a portion of a removable card slot 108, (i.e. an I/O interface) which can accept memory cards 110 or other devices for storing and/or accessing data, including a computer interface. Wireless communication capability is preferably built-in to the appliance 100 as well.

A set of buttons 112 and 114 (i.e. a user control interface) at the periphery of the appliance 100 enable users to control a selected set of functionality within the appliance 100, such as activation of the capture 104 or sound 106 sensors.

The appliance 100 also includes an encapsulation element 116. The encapsulation element 116 preferably functions as a protective shell and isolates any sensitive components of the appliance 100 from a selective set of harsh environments and impacts. Such harsh environments may include, the outdoors, sand, dust, water, high humidity, chemicals, as well as others known to those skilled in the art. Impacts may include shock from dropping the appliance 100 from a variety of heights, scratches, and the like. The encapsulation element 116 can be formed using one or more layers of material. Materials include transparent or translucent materials, such as plastic or polycarbonate, as well as soft, shock-resistant materials, such as polymers, silicone, and rubber-like materials.

Figure 2:
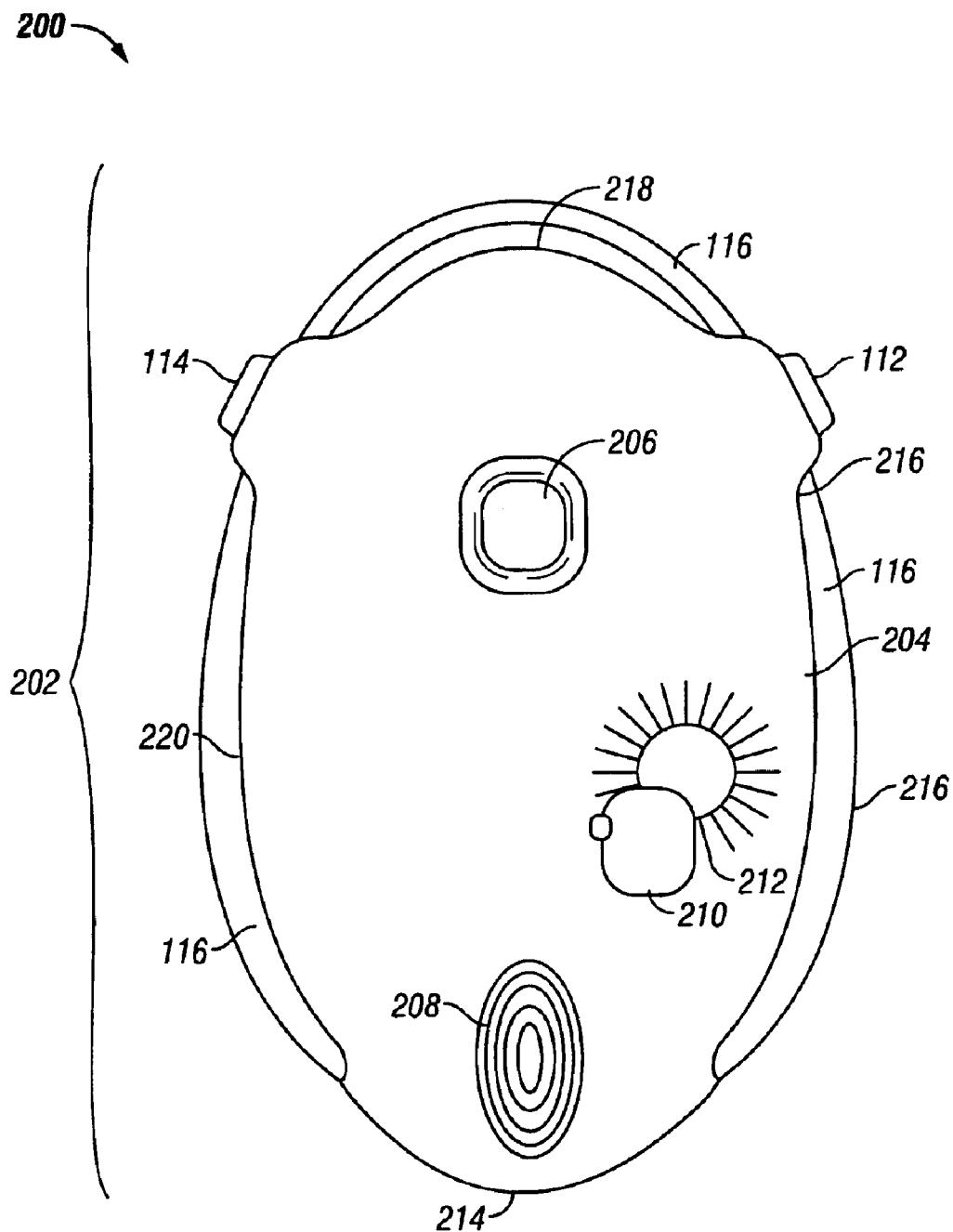
FIG. 2 is a rearward view of one embodiment of the appliance.

FIG. 2 is a rearward view 200 of one embodiment of the appliance 100. The appliance 100 includes an ovoid shaped rear surface 202 overlaid with a first display area 204, a second display area 206, and enshrouded with the encapsulation element 116. The first display area 204 is preferably used for presenting a user with a variety of control and selection information which can be either scrolled through, using one or more of the buttons 112 and 114, or moused through, using a touch pad 208 (i.e. a user control interface). The touch pad 208 also preferably functions as a biometric lock, permitting only registered users to operate the appliance 100.

The first display area 204 preferably extends as a skin to the outermost edges 214 through 220 of the rear surface 202. In this way the appliance 100 can be sized as compactly as possible, while still providing a greatest display area possible. Preferably the first display area 204 includes a transition region next to the outermost edges of the rear surface 202, which distorts (i.e. fades, blurs, etc.) information displayed on the first display area 204 which falls in to the transition region toward the edges of the appliance 100, making such information look like it is falling off the page. Also, the first display area 204 preferably displays information in a "layered" format, whereby some information is sized relative to other information in order to create a three-dimensional effect. For example, a clock 210 is shown on top of other information 212 in the background. Multiple colors can also be used to help key a user to more important or more relevant information as well. The first display area 204 also can be used for previewing live camera images and video.

The second display area 206 is preferably a "micro-display" used for presenting information to the user both more privately and more completely. A user places the appliance 100 and the second display area 206 right next to their eye for private viewing of documents, e-mail, or other selected information. Second display area 206 screen images can be toggled or changed using the buttons 112 or 114 while the user is holding the second display area 206 next to their eye. The second display area 206, in one embodiment, displays information using mini-LEDs (Light Emitting Diodes), allowing information to be viewed on the micro-display at a relative visual size equivalent to a 17" monitor. Due to the second display area 206 small size and close up viewing position, the second display area 206 can be viewed under any lighting condition.

While a preferred set of information for each of the two display areas 204 and 206 has just been discussed, those skilled in the art recognize that such information can be either interchangeably, or even redundantly, displayed.

Figure 3:
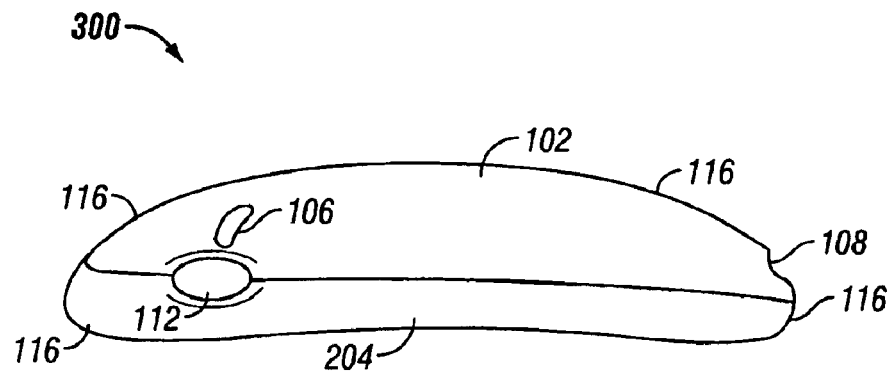
FIG. 3 is a side view of one embodiment of the appliance.

FIG. 3 is a side view 300 of the one embodiment of the appliance 100, showing the front surface 102, the sound sensor 106, the card slot 108, one button 112, first display area 204, and the encapsulation element 116.

Figure 4:
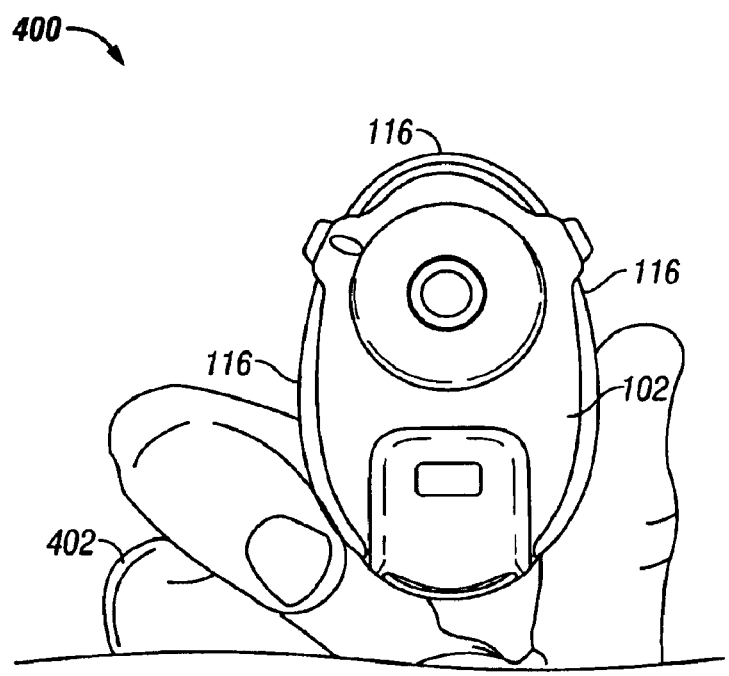
FIG. 4 shows a relative size of one embodiment of the appliance.

FIG. 4 shows a relative size 400 of the one embodiment of the appliance 100. As shown, a user's hand 402 preferably can easily hold the appliance's 100 organic/ergonomic shape. The appliance 100 can alternatively be carried in a pocket, hung around the neck with a lanyard, thereby allowing the PDA to be readily carried and used in an all activity context.

Figure 5:
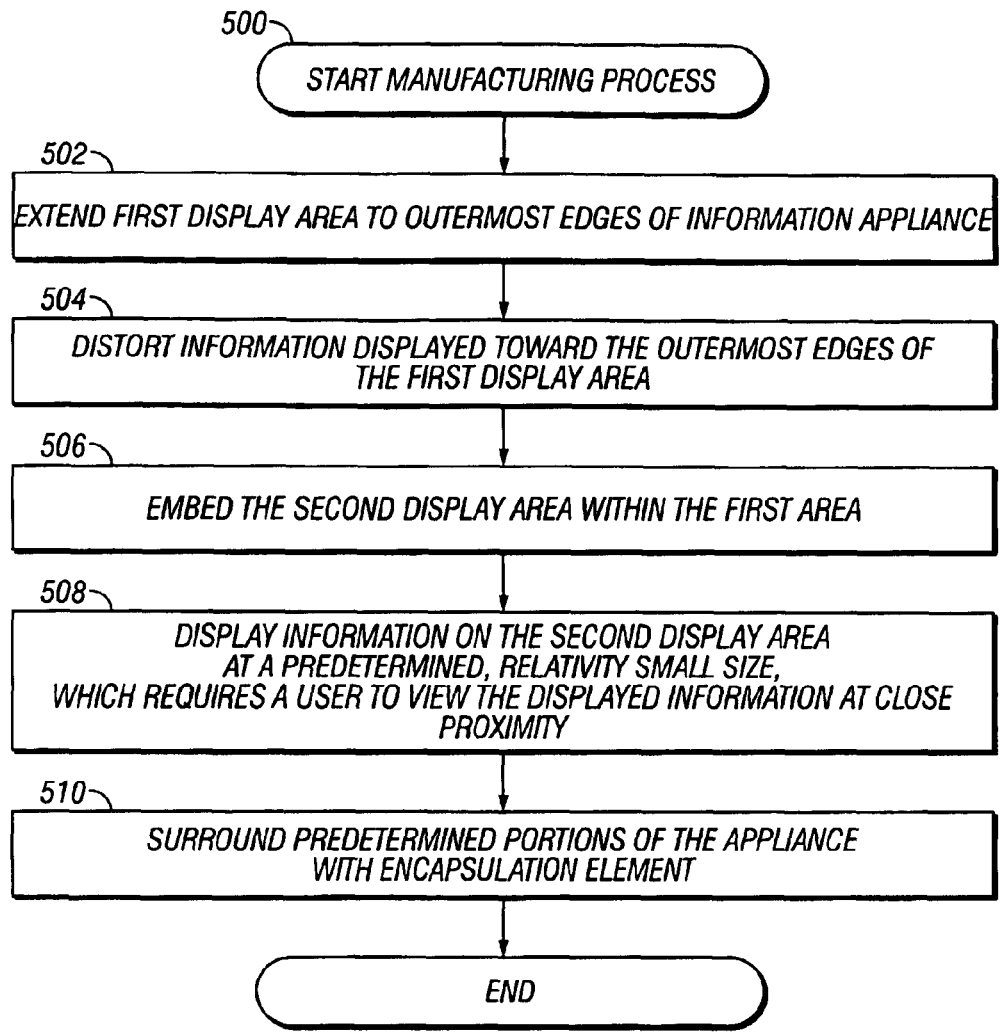
FIG. 5 is a flowchart of one embodiment of a method for manufacturing the appliance.

FIG. 5 is a flowchart of one embodiment of a method 500 for manufacturing the appliance 100. The method 500 begins in step 502 where the first display area 204 is extended to the outermost edges 214 through 220 of the appliance 100. Next in step 504, information displayed on the first display area 204 is intentionally distorted toward the outermost edges of the appliance 100. In step 506, the second display area 206 is preferably embedded within the first display area 204; however, those skilled in the art recognize that the second display area 206 could as well be located nearly anywhere on the appliance 100. In step 508, information displayed in the second display area 206 is of a predetermined, relatively small, size, requiring a user to view the displayed information by holding the second display area 206 at close proximity. Next in step 510, preferably all portions of the appliance 100 are surrounded by the encapsulation element 116, except the card slot 108, the buttons 112 and 114, the second display area 206, and the touch pad 208, thereby providing a significant amount of environmental exposure protection to the appliance 100.

While one or more embodiments of the present invention have been described, those skilled in the art will recognize that various modifications may be made. Variations upon and modifications to these embodiments are provided by the present invention, which is limited only by the following claims.

What is claimed is:

1. An apparatus, comprising:
   an information appliance;
   an encapsulation element, isolating predetermined exterior portions of the appliance from a predetermined set of environmental conditions;
   a first display area extending toward an outermost edge of the information appliance; and
   a second display area embedded within the first display area.

2. The apparatus of claim 1:
   wherein the encapsulation element includes a transparent portion.

3. The apparatus of claim 1:
   wherein the encapsulation element includes a translucent portion.

4. The apparatus of claim 1:
   wherein the encapsulation element includes a shock absorbent portion.

5. The apparatus of claim 1:
   wherein the encapsulation element includes a weatherproof portion.

6. The apparatus of claim 1 further comprising:
   a set of control interfaces;
   a set of I/O interfaces; and
   wherein the encapsulation element covers all exterior portions of the appliance except the set of control and I/O interfaces.

7. The apparatus of claim 1, wherein:
   the first display area extends to the outermost edge and displays a first set of information.

8. The apparatus of claim 7, wherein the first display area includes:
   a transition region next to the outermost edge which distorts that portion of the first set of information located within the transition region.

9. The apparatus of claim 7, wherein:
   the second display area, functions as a private display window for displaying information viewable to only one user at a time when the one user holds the appliance with one hand and ruts the second display area right next to the one user's eye.

10. The apparatus of claim 9:
wherein the second display area is of a size such that when held right next to a user's eye, allows information on the second display to be viewed by the user at a relative visual size equivalent to a desktop computer monitor.

11. The apparatus of claim 1, wherein the information appliance includes:
an image capture sensor;
a sound sensor; and
a memory card slot.

12. The apparatus of claim 1, wherein the information appliance has an ovoid shape.

13. An apparatus, comprising:
an information appliance;
a set of control interfaces;
a set of I/O interfaces;
a transparent encapsulation element covering all exterior portions of the appliance except the set of control and I/O interfaces;
an outermost edge;
a first display area extending to the outermost edge for displaying a first set of information;
a second display area, embedded within the first display area, for displaying information viewable to only one user at a time; and
an image capture sensor.

14. A process for manufacturing an information appliance, comprising:
identifying a predetermined set of environmental conditions;
identifying a predetermined set of structures on the appliance, which are to be protected from the environmental conditions;
selecting an encapsulation element which can protect the appliance from the environmental conditions; and
surrounding the set of structures with the encapsulation element;
extending a first display area toward an outermost edge of the information appliance; and
embedding a second display area within the first display area.

15. The process of claim 14, further comprising:
encapsulating the appliance in a translucent shell.

16. The process of claim 14, further comprising:
encapsulating the appliance in a transparent shell.

17. The process of claim 14, further comprising: encapsulating the appliance in a shock absorbent shell.

18. The process of claim 14, further comprising:
extending the first display area to the outermost edge of the appliance.

19. The process of claim 18, further comprising:
distorting the first display area proximate to the outermost edge.

20. The process of claim 18, further comprising:
displaying information in the second display area so as to be viewable to only a user holding the appliance right next to the user's eye, thereby allowing information on the second display to be viewed by the user at a relative visual size equivalent to a desktop computer monitor.

21. An apparatus, comprising:
an information appliance;
an encapsulation element, isolating predetermined exterior portions of the appliance from a predetermined set of environmental conditions;
wherein the information appliance has an ovoid shape.

22. The apparatus of claim 7, wherein the first display area includes:
a transition region next to the outermost edge which fades that portion of the first set of information located within the transition region.

23. The apparatus of claim 7, wherein the first display area includes:
a transition region next to the outermost edge which blurs that portion of the first set of information located within the transition region.

* * * * *

UNITED STATES PATENT AND TRADEMARK OFFICE
CERTIFICATE OF CORRECTION

PATENT NO. : 7,088,576 B2 Page 1 of 1
APPLICATION NO. : 10/384090
DATED : August 8, 2006
INVENTOR(S) : Nicolas Denhez It is certified that error appears in the above-identified patent and that said Letters Patent is hereby corrected as shown below:

On the Title page, in field (56), under "U.S. Patent Documents", in column 2, line 2, below "5,002,184 A  *  3/1991  Lloyd ..........206/305"
insert -- 5,012,520  *  4/1991  Steeger ..........381/315 --.

On the Title page, in field (56), under "U.S. Patent Documents", in column 2, line 13, below "2003/0012012 A1  *  1/2003  Hong ..........362/85"
insert -- 2003/0103032 A1  *  6/2003  Wong et al. .......345/156
          2004/0057578 A1  *  3/2004  Brewer ............379/433.1 --.

On the Title page, in field (56), under "U.S. Patent Documents", in column 2, line 13, below "2003/0012012 A1  *  1/2003  Hong ..........362/85"
insert -- FOREIGN PATENT DOCUMENTS
       JP   04143821 A   * 05/1992
       JP   404348742 A  * 12/1992
       GB   2 351 402 A  * 12/2000 --.

In column 4, line 32, in Claim 1, insert -- mechanically -- before "embedded".

In column 4, line 66, in Claim 9, delete "ruts" and insert -- puts --, therefor.

In column 5, line 25, in Claim 13, insert -- mechanically -- before "embedded".

In column 5, line 38, in Claim 14, after "conditions;" delete "and".

In column 6, line 1, in Claim 14, insert -- mechanically -- before "embedding".

Signed and Sealed this

Twenty-sixth Day of May, 2009

JOHN DOLL
*Acting Director of the United States Patent and Trademark Office*